(No Model.)

L. L. PALMER.
PUPILLOMETER AND BRIDGE MEASURE.

No. 557,220.    Patented Mar. 31, 1896.

Witnesses.    Inventor
W. J. Withrow.    L. L. Palmer
E. R. Case    by Fetherstonhaugh & Co.
           Atty

UNITED STATES PATENT OFFICE.

LORAN LESTER PALMER, OF TORONTO, CANADA.

PUPILLOMETER AND BRIDGE-MEASURE.

SPECIFICATION forming part of Letters Patent No. 557,220, dated March 31, 1896.

Application filed October 5, 1895. Serial No. 564,727. (No model.)

*To all whom it may concern:*

Be it known that I, LORAN LESTER PALMER, physician, residing at the city of Toronto, in the county of York, in the Province of Ontario, Canada, have invented certain new and useful Improvements in Pupillometers and Bridge-Measures, of which the following is a specification.

My invention relates to improvements in pupillometers and bridge-measures; and the object of the invention is to design a combined pupillometer and bridge-measure of simple construction by which the various measurements necessary for the proper fitting of spectacles and eyeglasses may be rapidly and accurately gotten at; and it consists, essentially, of two parallel sliding bars suitably connected and provided with index-pointers and heels, the sliding bars and heels being divided off into inches on one side and millimeters on the other, as hereinafter more particularly explained.

Figure 1:
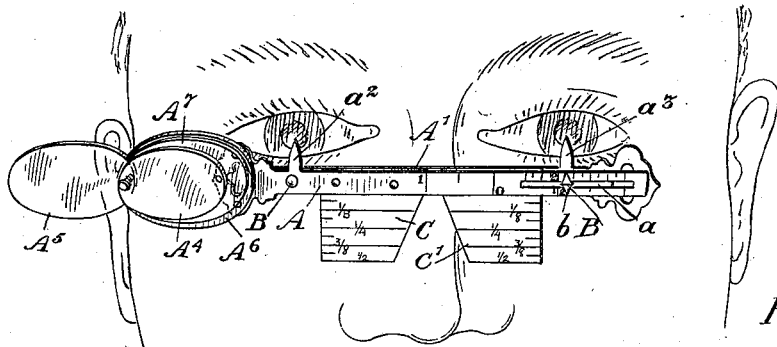
Figure 2:
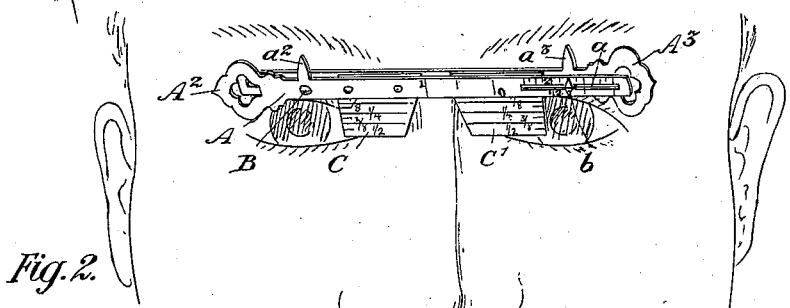
Figure 3:
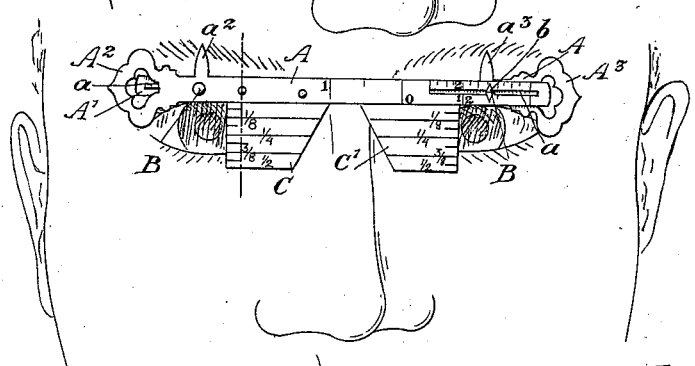
Figures 4, 5:
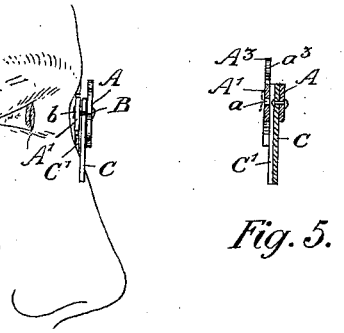

Figure 1 is a front perspective view showing the applicability of my instrument in measuring the distances apart of the pupils of the eyes. Fig. 2 is a similar view showing the instrument tilted inwardly, so as to measure the width of the bridge. Fig. 3 is a similar view showing the instrument arranged to measure the distance from the top of the bridge to the center of the pupil, or more properly the height of the bridge. Fig. 4 is a profile view showing the manner of obtaining the requisite distance of the glass from the eye. Fig. 5 is a cross-section through the instrument.

In the drawings like letters of reference indicate corresponding parts in each figure.

A and A' are the sliding bars, which are connected together by the index-clips B, which extend through one sliding bar into slots $a$ in the adjacent bar, the ends of the clips being turned up so as to form pointers $b$, as shown. There are two index-clips, one toward each end of the sliding bar. The sliding bar A is divided into inches and portions of inches along the upper edge. The opposite sliding bar A' may be divided into millimeters, if desired.

$a^2$ and $a^3$ are the pupil-pointers, which extend upwardly from the top edges of the sliding bars A and A' respectively. Beneath the slot $a$ is marked off a scale beginning with the half-inch and subdivided from left to right. The half-inch represents the minimum distance between the inner lower corners of the heels C C'. The heel C is attached or forms part of the bar A, while the heel C' is attached or forms part of the bar A', both heels being preferably attached to their respective bars between the sliding bars. The ends of the sliding bars are formed with gripping-plates $A^2$ and $A^3$.

It will be noticed that the inner ends of the heels are oblique as to the sliding bars, while the outer edges are at right angles to them. The outer edge of each heel is divided into portions of an inch, as indicated on this side. The other side may be divided into millimeters.

Having described the principal parts involved in my invention, I shall now describe its operation and utility.

In order to get the distance apart of the centers of the pupils of the eyes from each other, the instrument is placed in the position shown in Fig. 1, so that the pupil-pointers will come opposite the pupils. The index clip-pointers $b$ will thus be brought to the point in the scale which will indicate the exact distance apart from pupil to pupil, thus giving the requisite distance apart of the center of the lenses from each other.

In Fig. 2 I show the means whereby the width of the bridge may be measured. The minimum distance between the lower inner points of the heel is one-half inch, as indicated beneath the slot $a$ by the index one-half. Any excess of this is indicated on the scale beneath the slot to the outside. It will thus be seen that the exact distance of the lower points of the heel from each other is accurately determined, thus giving the width that the bridge of the spectacles has to be at this point. By taking the instrument and laying it on paper the shape may be traced along the oblique side of the heels and the bottom of the sliding bars, so as to give the exact shape of the bridge.

By throwing the instrument to the horizontal and adjusting it so that the heels extend backwardly onto the nose the distance apart at the inner end of the heels may be found, so as to determine, when eyeglasses are used, the distance at which the retaining-clips should be placed from each other, both at the top and bottom.

In Fig. 3 I show the disposition of the instrument in order to obtain the distance of the center of the pupils below the bridge, which is accurately determined by the scale at the outer edges of the heel C.

In Fig. 4 I show how my instrument may be employed in order to get the requisite distance of the glasses from the eye. It is essential, as oculists well know, to have the glasses far enough away from the eyes so that the lashes will not have any tendency to touch or brush against the glass. This can be readily seen at a glance when the instrument is placed in position against the bridge of the nose.

In Fig. 1 it will be noticed that I show one end of the bar A with a lens-shaped plate riveted to the gripping-plate, which is shown in dotted lines. At the outer end of the plate $A^6$, I provide supplemental lens-shaped plates $A^4$, $A^5$, and $A^7$, which are pivotally swung upon a rivet $a^2$. By thus providing the different-sized plates I am enabled to ascertain very readily the size of glass or lens and rim suitable for different faces. Where the smaller sizes are required, of course smaller-sized plates may be swung out, as indicated in this figure, in which $A^5$ is shown out. Although I show these lens-shaped plates in the form shown, it will be understood that they might be in rim form suitably swung; but I prefer the plate forms.

All of these measurements, it will be seen, are very readily obtained by my instrument, which is much more simple and accurate than any of which I am aware.

What I claim as my invention is—

1. In combination in a pupillometer, the corresponding sliding bars and the independent pupil-pointers and the independent index-pointers carried by each of said bars, substantially as described.

2. The combination with the sliding bars suitably connected together, of heels one for each bar extending downwardly from same as and for the purpose specified.

3. The combination with the sliding bars suitably connected together, of flat rectangular heels one for each bar extending downwardly from same and an index-pointer attached to one bar and sliding over the other.

4. The combination with the sliding bars each provided with a pupil index-pointer and having a scale marked thereon, of slots in each bar and index-clip pointers extending through the slots holding the bars together and projecting over the scales as and for the purpose specified.

5. The combination with the sliding bars suitably connected together and adjustable lengthwise, of heels one for each bar provided with scales on their outer edges, as and for the purpose specified.

6. In a pupillometer and bridge-measure the combination with the sliding bar, of a lens-sized plate attached to or forming part of one end of the bar and having supplemental lens-sized plates pivotally connected to the outer ends of the plate as and for the purpose specified.

LORAN LESTER PALMER.

Witnesses:
B. BOYD,
E. R. CASE.